US009817288B2

United States Patent
Tomioka et al.

(10) Patent No.: US 9,817,288 B2
(45) Date of Patent: Nov. 14, 2017

(54) LIQUID CRYSTAL DISPLAY DEVICE

(71) Applicant: Japan Display Inc., Tokyo (JP)

(72) Inventors: Yasushi Tomioka, Tokyo (JP);
Toshimasa Ishigaki, Tokyo (JP);
Hidehiro Sonoda, Tokyo (JP); Sumito Ueta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/343,329

(22) Filed: Nov. 4, 2016

(65) Prior Publication Data

US 2017/0075179 A1    Mar. 16, 2017

Related U.S. Application Data

(63) Continuation of application No. 14/564,129, filed on Dec. 9, 2014, now Pat. No. 9,519,196.

(30) Foreign Application Priority Data

Dec. 9, 2013 (JP) ................................. 2013-254205

(51) Int. Cl.
*G02F 1/1362* (2006.01)
*G02F 1/1337* (2006.01)
(Continued)

(52) U.S. Cl.
CPC ...... *G02F 1/136227* (2013.01); *G02F 1/1337* (2013.01); *G02F 1/1368* (2013.01);
(Continued)

(58) Field of Classification Search
CPC ......... G02F 1/136227; G02F 1/133707; G02F 2001/133357
See application file for complete search history.

(56) References Cited

U.S. PATENT DOCUMENTS 7,466,389 B2 * 12/2008 Nomura ................ G02F 1/1345
349/138
2005/0036092 A1 * 2/2005 Yeh .................... G02F 1/136227
349/139

(Continued)

FOREIGN PATENT DOCUMENTS

| JP | 2007-322563 A | 12/2007 |
| JP | 2011-59314 A | 3/2011 |
| JP | 2013-140386 A | 7/2013 |

OTHER PUBLICATIONS

Chinese Office Action dated Feb. 23, 2017 for corresponding CN application No. 201410742976.6, With English Translation.

*Primary Examiner* — Anne Hines
(74) *Attorney, Agent, or Firm* — Typha IP LLC

(57) ABSTRACT

A liquid crystal display device comprising a TFT substrate having pixels each including a common electrode formed on an organic passivation film, an interlayer insulating film formed so as to cover the common electrode, a pixel electrode having a slit and formed on the interlayer insulating film, a through-hole formed in the organic passivation film and the interlayer insulating film, and a source electrode electrically conducted to the pixel electrode via the through-hole. A taper angle at a depth of D/2 of the through-hole is equal to or more than 50 degrees. The pixel electrode covers part of a side wall of the through-hole but does not cover the remaining part of the side wall of the through-hole. This configuration facilitates the alignment film material to flow into the through-hole, thereby solving a thickness unevenness of the alignment film in vicinity of the through-hole.

16 Claims, 11 Drawing Sheets

(51) Int. Cl.
  *G02F 1/1335* (2006.01)
  *G02F 1/1368* (2006.01)
  *G02F 1/1333* (2006.01)
(52) U.S. Cl.
  CPC .. *G02F 1/133345* (2013.01); *G02F 1/133512* (2013.01); *G02F 1/133707* (2013.01); *G02F 2001/133357* (2013.01); *G02F 2201/121* (2013.01); *G02F 2201/123* (2013.01)

(56) References Cited

U.S. PATENT DOCUMENTS

| | | |
|---|---|---|
| 2007/0279564 A1 | 12/2007 | Iwato et al. |
| 2011/0058133 A1 | 3/2011 | Ishigaki et al. |
| 2012/0268678 A1 | 10/2012 | Tomioka et al. |

* cited by examiner

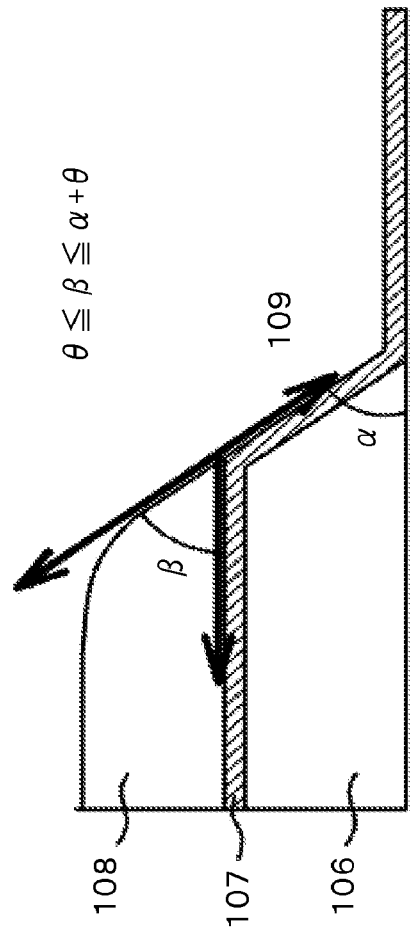
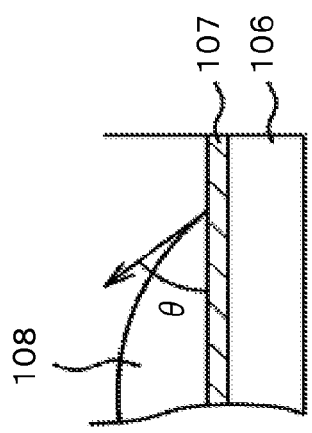
FIG. 16B
FIG. 16A

LIQUID CRYSTAL DISPLAY DEVICE

CROSS-REFERENCE TO RELATED APPLICATIONS

This application is a continuation of U.S. patent application Ser. No. 14/564,129 filed on Dec. 9, 2014. Further, this application claims priority from Japanese Patent Application No. 2013-254205 filed on Dec. 9, 2013, the contents of which are hereby incorporated by reference into this application.

BACKGROUND OF THE INVENTION

1. Field of the Invention

The present invention relates to a display device. The invention more particularly relates to a liquid crystal display device in which reduction in transmissivity is small even in a case where the screen is a high-definition screen, the liquid crystal display device having few pixel defects in the high-definition screen.

2. Description of the Related Art

In a liquid crystal display device, a thin film transistor (TFT) substrate in which pixels each including a pixel electrode, a TFT, and the like are formed like a matrix, a counter substrate facing the TFT substrate and having color filters formed at positions in facing relation to the pixel electrodes on the TFT substrate are arranged, and liquid crystal is sandwiched between the TFT substrate and the counter substrate. The liquid crystal display device forms images by controlling light transmissivity of liquid crystal molecules at each pixel.

The liquid crystal display device is flat and lightweight. Thus, the application of the liquid crystal display device has been extended in various fields. A small liquid crystal display device has widely been used in portable information terminals, such as mobile phones, smartphones, and Digital Still Cameras (DSCs). A viewing angle characteristic is a key issue in liquid crystal display devices. The viewing angle characteristic relates to a phenomenon that brightness or chromaticity changes between cases where a screen of the liquid crystal display device is viewed from front and where the screen is viewed from an oblique direction. An In-Plane Switching (IPS, which is a registered trademark of Japan Display Inc.) system causing a horizontal electric field to operate liquid crystal molecules has an excellent viewing angle characteristic.

Although various IPS systems exist, e.g., a system in which a common electrode is formed in a planar and solid manner and in which a comb-teeth pixel electrode is arranged above the common electrode so as to sandwich an insulating film between the pixel electrode and the common electrode, and to cause an electric field generated between the common electrode and the pixel electrode to rotate liquid crystal molecules. This system can increase the transmissivity. Accordingly, this system is currently a mainstream. The common electrode and an interlayer insulating film are formed on an organic passivation film serving also as a planarizing film.

Meanwhile, if a pixel size is reduced by providing the liquid crystal display device with a high-definition screen, a ratio of a radial cross-sectional area of a through-hole connecting between a pixel electrode and a source electrode of the TFT is increased.

In the above IPS liquid crystal display device, if the ratio of the radial cross-sectional area of the through-hole to the pixel size increases, an adhesion strength between the organic passivation film and the interlayer insulating film formed thereon decreases. Thus, a problem occurs, in which the interlayer insulating film peels off. JP-2011-59314-A describes a device which reduces stress on the interlayer insulating film and which prevents peeling-off of the interlayer insulating film by forming the interlayer insulating film not in the through-hole but only on the organic passivation film.

If a diameter of the through-hole is reduced as the pixel size is reduced by provision of the high-definition screen, a taper angle of a wall portion of the through-hole (hereinafter sometimes referred to also as a taper angle of the through-hole) should be increased. On the other hand, an alignment film is used to initially align the liquid crystal. A material of the alignment film, which is initially in a liquid state, is applied by flexographic printing, inkjet printing, or the like.

If the taper angle of the through-hole is increased, applying the material of the alignment film may cause a phenomenon that the material of the alignment film does not go into the through-hole. Then, a display defect, such as a luminance unevenness, occurs due to a fact that no alignment film exists in the through-hole, or to a thickness unevenness of the alignment film in a periphery of the through-hole. JP-2007-322563-A describes a device that varies a height at a periphery of the through-hole thereby to facilitate the alignment film to flow into the through-hole.

If the pixel size is reduced, a ratio of a pixel electrode to each pixel is relatively reduced, so that a transmissivity at each pixel is decreased. According to photoalignment of the alignment film initially aligning the liquid crystal, an alignment treatment can be performed on an inner wall portion of the through-hole. Thus, the inner wall portion of the through-hole can be used as a display area. JP-2013-140386-A describes a device that increases the transmissivity at each pixel by utilizing photoalignment to utilize an inside of the through-hole as a display area.

SUMMARY OF THE INVENTION

Recently, even a small liquid crystal display device requires a high-definition screen such as a Video Graphics Array (VGA) screen using 640×480 dots. Incidentally, a dot is a set of three pixels, i.e., a red pixel, a green pixel, and a blue pixel. Therefore, the VGA screen uses pixels the number of which is 1920×480. To enable VGA on a 3-inch screen, the shorter diameter of each pixel is set to be very small, e.g., 32 μm. Further, another high-definition screen has been developed, in which the shorter diameter of each pixel is less than 30 μm.

Even if each pixel is reduced in size, in order to maintain a predetermined transmissivity, it is necessary to arrange the TFT, the through-hole, and the like in a small area, and to increase the ratio of the area of the pixel electrode to the pixel as much as possible. If the radial cross-sectional area of the through-hole is reduced, the taper angle of the through-hole is increased. Thus the material of the alignment film becomes difficult to flow into the through-hole. Consequently, a display defect, such as a luminance unevenness, occurs.

If a height difference is provided among upper surrounding portions of the through-hole like the device described in JP-2007-322563-A, what is called an organic passivation film cannot be used. This is because of the following reasons. That is, the organic passivation film is formed thick to have a thickness of 2 μm to 4 μm. Thus, a surface of the organic passivation film is flat. Consequently, it is difficult to form a height difference among the surrounding portions of the through-hole.

On the other hand, to meet demands for uniformizing a thickness of the liquid crystal layer, some types of the liquid crystal display devices need to use an organic passivation film. Since the organic passivation film is formed thick to have a thickness of 2 μm to 4 μm, a problem of increasing the radial cross-sectional area of the through-hole becomes increasingly serious if a through-hole is formed in the organic passivation film.

FIG. 14 is a perspective view illustrating the above problem of an IPS liquid crystal display device. FIG. 15 is a cross-sectional view taken along line I-I shown in FIG. 14. In FIG. 14, a pixel electrode 107 having a slit 1071 provided therein is connected through a through-hole to a source electrode 102. An interlayer insulating film (not shown) exists under the pixel electrode 107. Under the interlayer insulating film, a common electrode (not shown) exists.

FIG. 15 is a cross-sectional view illustrating a through-hole 109 and a neighborhood thereof. In FIG. 15, a gate insulating film 101 is formed on a TFT substrate 100. On the gate insulating film 101, a source electrode 102 extending from a TFT is formed. An inorganic passivation film 103 is formed on the source electrode 102 and the gate insulating film 101. An organic passivation film 104 is formed on the inorganic passivation film 103. A common electrode 105 is formed on the organic passivation film 104. An interlayer insulating film 106 is formed so as to cover the common electrode 105. A pixel electrode 107 having a slit is formed on the interlayer insulating film 106. This structure may be configured without providing an inorganic passivation film under the organic passivation film.

In FIG. 15, a counter substrate 200 is arranged opposite to the TFT substrate 100. A liquid crystal layer 300 is sandwiched between the TFT substrate 100 and the counter substrate 200. A black matrix 202 is formed on part of the counter substrate 200 in facing relation to the through-hole 100. A color filter 201 is formed on part of the counter substrate 200 in facing relation to the pixel electrode 107. An overcoat film 203 is formed so as to cover the black matrix 202 and the color filter 201. An alignment film 108 is formed on the overcoat film 203.

At the side of the TFT substrate 100, the pixel electrode 107 is connected to the source electrode 102 via the through-hole 109 formed in the inorganic passivation film 103, the organic passivation film 104, and the interlayer insulating film 106. If the screen is changed to a high-definition screen so as to reduce the area of each pixel, in order to ensure a transmissivity at each pixel, it is necessary to increase the taper angle of the inner wall of the through-hole 109 and to reduce the radial cross-sectional area of the through-hole 109.

However, as illustrated in FIG. 15, if the taper angle of the through-hole 109 is large, the alignment film material 108, which is initially liquid, is difficult to flow into the through-hole 109 from a top face 1091 (see FIG. 17) of the through-hole 109. Thus, a problem occurs, in which no alignment film is formed in the through-hole. In addition, another problem occurs, in which the thickness of the alignment film 108 is increased on the periphery of the through-hole 109, so that the thickness unevenness of the alignment film 108 occurs. Then, display defects, such as a luminance unevenness, occur due to absence of an alignment film in the through-hole 109, or due to the thickness unevenness of the alignment film in the periphery of the through-hole 109.

The reason why thus the alignment film does not flow into the through-hole 109 is considered as follows. FIGS. 16A and 16B illustrate a contact angle of the alignment film material 108. FIG. 16A illustrates a case where the alignment film material 108 is dropped onto the planar pixel electrode 107 formed of ITO. In this case, the contact angle is θ. FIG. 16B illustrates a contact angle in a case where the alignment film material 108 of a liquid form exists and is near the top face 1091 of the through-hole 109 having a taper angle α.

In FIG. 16B, the contact angle in vicinity of the top face of the through-hole 109 is β which is larger than θ. That is, it can be said that the alignment film material 108 is more difficult to wet and spread at the top face of the through-hole 109 than on the pixel which is flat. Here, assuming that "α" denotes the taper angle of the through-hole 109, that "β" denotes the contact angle of the alignment film material 108 at the top face of the through-hole 109, and that "θ" denotes the contact angle of the alignment film material 108 on the planar pixel electrode 107 shown in FIG. 16A, a relationship among α, β, and θ is given by the following expression.

$$\theta \le \beta \le \alpha + \theta$$

Accordingly, the alignment film material 108 spreads over the pixel electrode 107 formed of ITO in vicinity of the through-hole 109 without going into the through-hole 109. That is, as illustrated in FIG. 15, the alignment film material 108 is formed thick on the periphery of the through-hole 109.

An object of the present invention is to provide a liquid crystal display device using an organic passivation film in a TFT substrate, which is configured to facilitate each alignment film material to go into a through-hole even in a case where the area of each pixel is reduced using a high-definition screen, and where the radial cross-sectional area of the through-hole is limited.

The present invention is accomplished to overcome the above problems. Specific means according to the present invention are as follows.

(1) A liquid crystal display device includes: a TFT substrate having pixels each having a common electrode formed on an organic passivation film, an interlayer insulating film formed so as to cover the common electrode, a pixel electrode having a slit and formed on the interlayer insulating film, a through-hole formed in the organic passivation film and the interlayer insulating film, and a source electrode electrically conducted to the pixel electrode via the through-hole; a counter substrate having color filters formed in facing relation to the pixels, and a black matrix formed among the color filters; and liquid crystal sandwiched between the TFT substrate and the counter substrate. When the through-hole formed in the organic passivation film assumes a cross-section in which a top face is defined on the side of the counter substrate and a bottom face is defined on the side of the source electrode, the top face has a diameter larger than that of the bottom face, and the through-hole has a depth of D, then, a taper angle at a depth of D/2 of the through-hole is equal to or more than 50 degrees. The common electrode covers part of a side wall of the through-hole but does not cover the remaining part of the side wall of the through-hole.

(2) A liquid crystal display device includes: a TFT substrate having pixels each having a common electrode formed on an organic passivation film, an interlayer insulating film formed so as to cover the common electrode, a pixel electrode having a slit and formed on the interlayer insulating film, a through-hole formed in the organic passivation film and the interlayer insulating film, and a source electrode electrically conducted to the pixel electrode via the through-hole; a counter substrate having color filters formed in facing relation to the pixels, and a black matrix formed among the color filters; and liquid crystal sandwiched between the TFT substrate and the counter substrate. When the through-hole formed in the organic passivation film assumes a cross-section in which a top face is defined on the side of the counter substrate and a bottom face is defined on the side of the source electrode, the top face has a diameter larger than that of the bottom face, and the through-hole has a depth of D, then, a taper angle at a depth of D/2 of the through-hole is equal to or more than 50 degrees, and the slit of the pixel electrode extends to a depth of 1 μm or more from a top surface of the organic passivation film or to a depth of D/4 or more from the top surface of the organic passivation film.

According to the present invention, a liquid crystal display device using a high-definition screen to thereby reduce the area of each pixel and also using an organic passivation film in a TFT substrate is provided, which can stably form an alignment film in a through-hole, even if a through-hole diameter is reduced. Accordingly, the liquid crystal display device according to the present invention can prevent a display defect such as a luminance unevenness due to absence of the alignment film or due to the thickness unevenness of the alignment film in the periphery of the through-hole.

BRIEF DESCRIPTION OF THE DRAWINGS

FIGS. 16A and 16B illustrate a definition of a contact angle; and

DESCRIPTION OF THE PREFERRED EMBODIMENTS

Hereinafter, the present invention is described in detail with reference to embodiments.

First Embodiment

Figure 1:
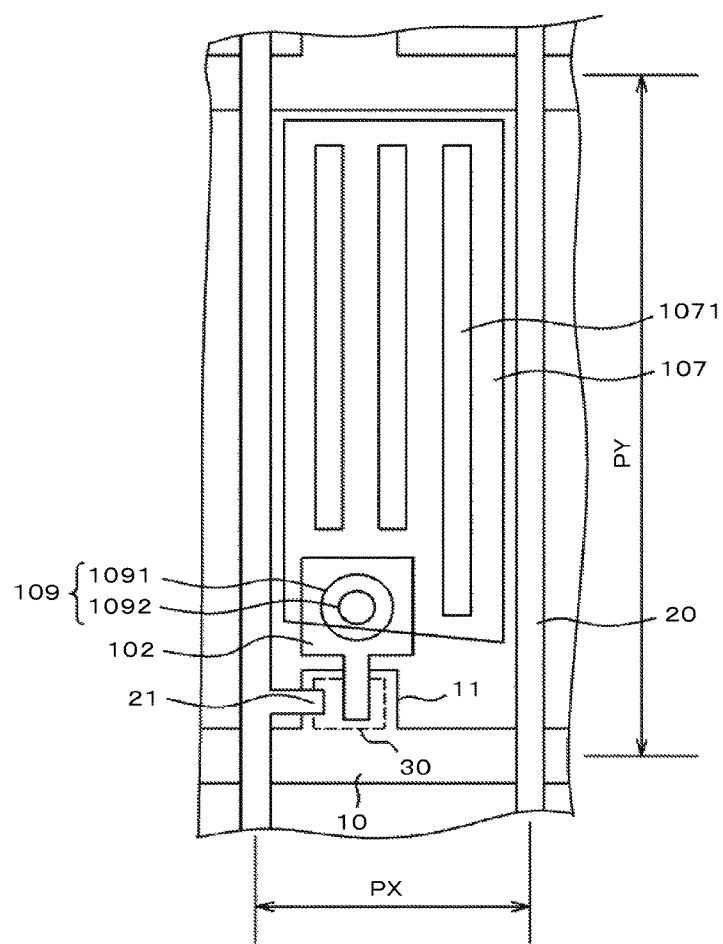
FIG. 1 is a plan view of a pixel of a liquid crystal display device to which the present invention is applied.

FIG. 1 is a plan view of a pixel in a TFT substrate of a liquid crystal display device to which the present invention is applied. FIG. 1 illustrates an example of an IPS liquid crystal display device. In FIG. 1, scanning lines 10 extend in a lateral direction and are arranged in a longitudinal direction at a predetermined pitch PY. Video signal lines 20 extend in the longitudinal direction and are arranged in the lateral direction at a predetermined pitch PX. Each region surrounded by the scanning line 10 and the video signal line 20 is a pixel.

In FIG. 1, a gate electrode 11 branches from the scanning line 10. A semiconductor layer 30 is formed on the gate electrode 11. On the other hand, a source electrode 102 is formed on the semiconductor layer 30. The source electrode 102 extends in the direction of a pixel electrode 107 and increases in width at part thereof overlapping with a pixel electrode 106 and under a through-hole 109. The source electrode 102 serves also, as a light shielding film preventing occurrence of light leakage in the through-hole 109.

In FIG. 1, the pixel electrode 107 having a slit 1071 is formed like a rectangle. An interlayer insulating film is formed under the pixel electrode 107. A planar common electrode is formed under the interlayer insulating film. Lines of electric force from the pixel electrode 107 are formed so as to pass through a slit 1071 toward the common electrode.

In FIG. 1, the pixel electrode 107 is connected to the source electrode 102 via the through-hole 109. The through-hole 109 is formed in an organic passivation film whose thickness is large. Thus, the through-hole 109 has a taper so as to have a larger-diameter top face 1091 and a smaller-diameter bottom face 1092. According to the present embodiment, the source electrode 102 is formed so as to be slightly larger than the through-hole 109, and serves also as a light shielding film for the through-hole 109. The source electrode 102 may be shaped cross-sectionally like a circle corresponding to a shape of the through-hole 109. To obtain a desired transmissivity, the pixel may be configured so that part of the top face 1091 or the bottom face 1092 of the through-hole 109 protrudes from the source electrode 102.

Figure 2:
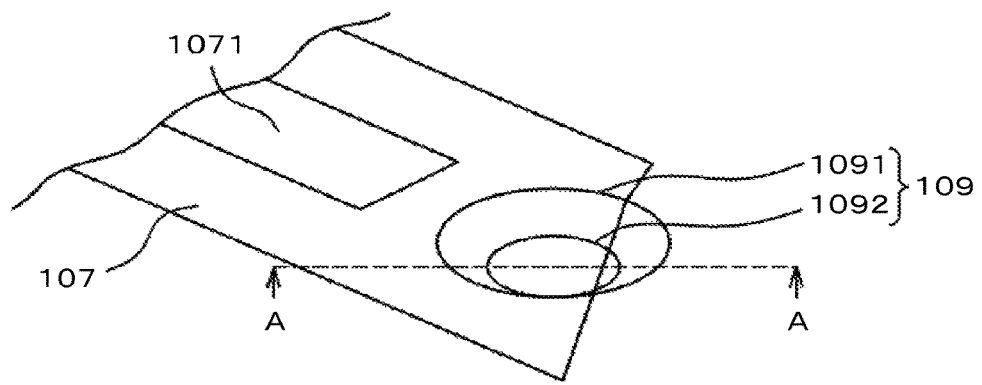
FIG. 2 is a perspective view illustrating a pixel electrode and a through-hole according to a first embodiment.

FIG. 2 is a perspective view illustrating a relationship between the pixel electrode 107 and the through-hole 109. In FIG. 2, the pixel electrode 107 having the slit 1071 covers the through-hole 109 and is electrically conducted to the source electrode 102. However, according to the present embodiment, the pixel electrode 107 does not cover the entire inner wall of the through-hole 109. In an outside of the pixel electrode 107, the pixel electrode 107 does not cover the inner wall and the periphery of the top face of the through-hole 109.

In a configuration illustrated in FIG. 2, when an alignment film material 108 of a liquid form is applied, the alignment film material 108 spreads over a SiN film configuring the interlayer insulating film 106 from an ITO film configuring the pixel electrode 107. Thus, the alignment film material 108 flows into the through-hole 109, starting from a boundary portion of a step-like part, which is about 50 nm, of the ITO film. Further, since the alignment film material 108 is easier to wet and spread on the SiN film than on the ITO film, the alignment film material 108 can flow into the through-hole 109 via the interlayer insulating film 106 made of SiN.

Figure 3:
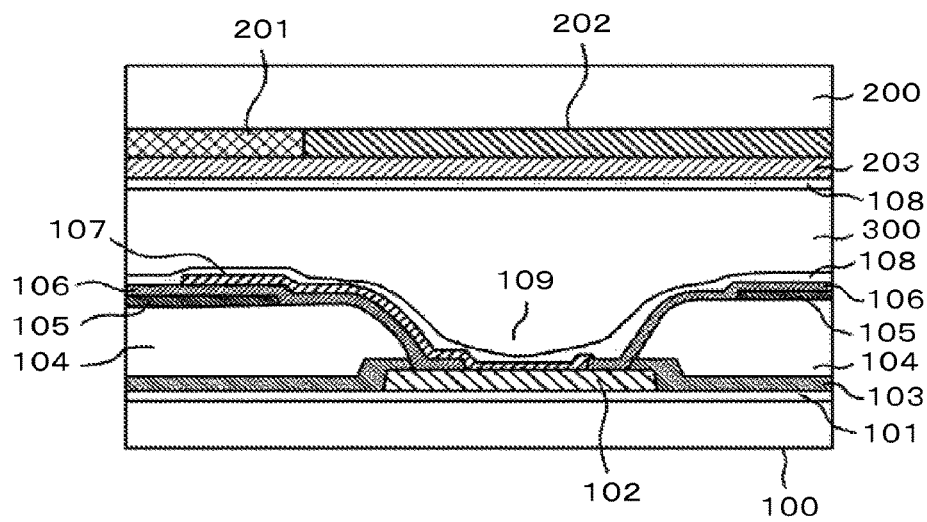
FIG. 3 is a cross-sectional view taken on line A-A shown in FIG. 2.

Accordingly, as illustrated in FIG. 3, the alignment film material 108 flows into the through-hole 109. Even in a periphery of the through-hole 109, the alignment film 108 can be formed so as to have a uniform thickness. FIG. 3 is a cross-sectional view of the liquid crystal display device, which corresponds to a cross-section taken along line A-A shown in FIG. 2. Description of configurations of each of the TFT substrate 100 and the counter substrate 200 illustrated in FIG. 3, which have been described with reference to FIG. 15, is omitted here.

Figure 15:
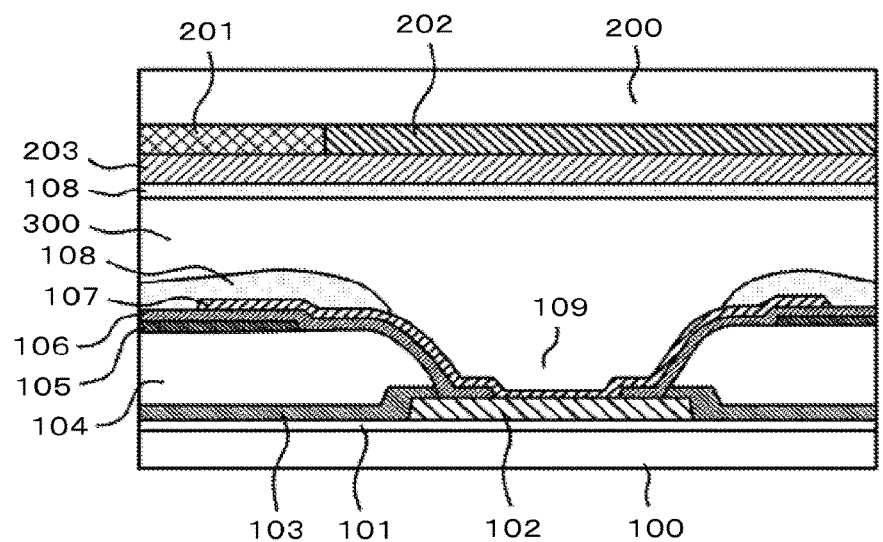
FIG. 15 is a cross-sectional view taken on line I-I shown in FIG. 14.
Figure 17:
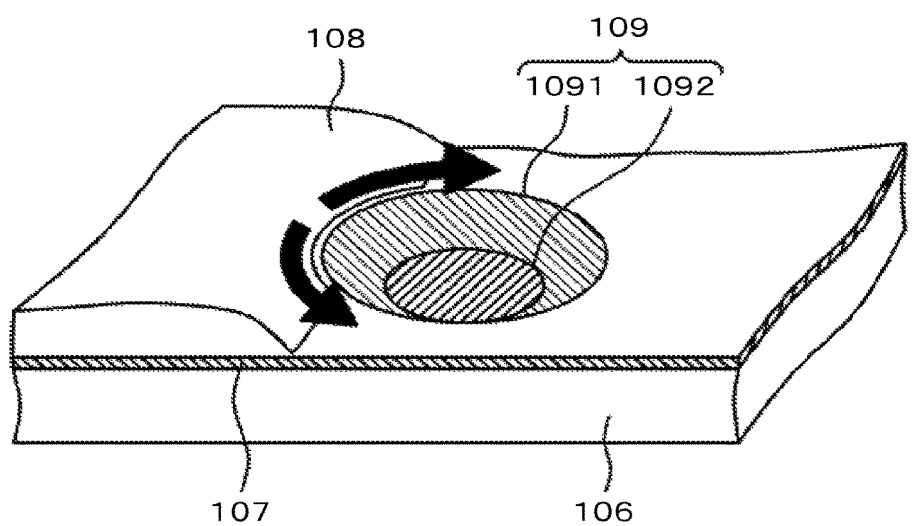
FIG. 17 is a perspective view illustrating a moving direction of a material of an alignment film according to the related art.

A main difference between the configurations illustrated in FIGS. 3 and 15 is that the pixel electrode 107 in the configuration illustrated in FIG. 3 is not completely formed on the entire through-hole 109. The pixel electrode 107 is formed on a left-side periphery and a left-side inner wall of the through-hole 109, as viewed in FIG. 3. However, the pixel electrode 107 is not formed on a right-side periphery and a right-side inner wall of the through-hole 109, as viewed in FIG. 3. That is, the alignment film material 108 illustrated in FIG. 3 flows into the through-hole 109 from the right side of the through-hole 109, as viewed in FIG. 3. With this configuration, even if a taper angle of the through-hole 109 is large, the alignment film material 108 can stably flow into the through-hole 109.

Incidentally, if the taper angle of the through-hole 109 is about 50 degrees in the conventional configuration, at a certain frequency, a phenomenon occurs, in which the alignment film material 108 does not flow into the through-hole 109. Further, if the taper angle of the through-hole 109 is equal to or more than 60 degrees, the alignment film material 108 hardly flows into the through-hole 109. Accordingly, a display unevenness occurs over a wide range of the screen.

Meanwhile, as illustrated in FIG. 3, because an organic passivation film 104 serves as a planarizing film, the organic passivation film 104 is formed thick, e.g., a thickness of 2 μm to 4 μm. That is, the organic passivation film 104 is very thick, as compared with other films. Therefore, it can be considered that the shape of the through-hole 109 is determined by the shape of the through-hole formed in the organic passivation film 104. That is, the taper angle of the inner wall of the organic passivation 109 can be considered as the taper angle of the through-hole formed in the organic passivation film 104.

Figure 4:
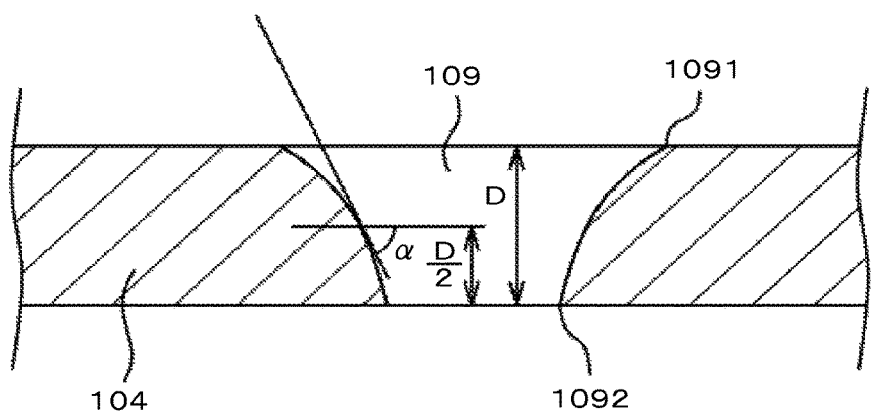
FIG. 4 illustrates a definition of a taper angle of the through-hole.

FIG. 4 is a cross-sectional view for defining the taper angle of the through-hole 109. The through-hole 109 in this case is the through-hole 109 formed in the organic passivation film 104. As illustrated in FIG. 4, assuming that a depth of the through-hole 109 formed in the organic passivation film 104 is D, a taper angle α of the through-hole 109 is defined as an angle formed by a tangent line to the wall at a depth of D/2, i.e., half the depth of the through-hole 109, and a line connecting between cross-sections of top surfaces of the organic passivation film 104.

Figure 5:
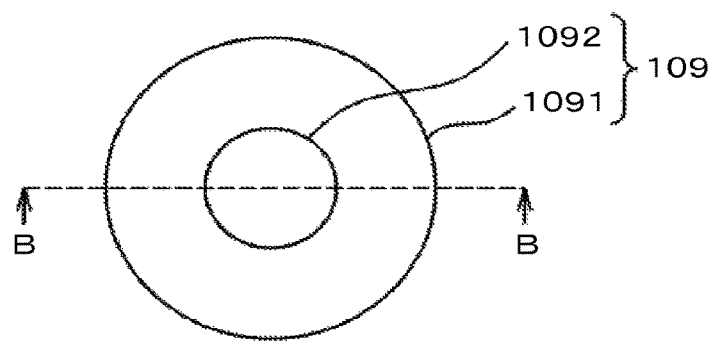
FIG. 5 illustrates an example of a planar shape of the through-hole.
Figure 5:
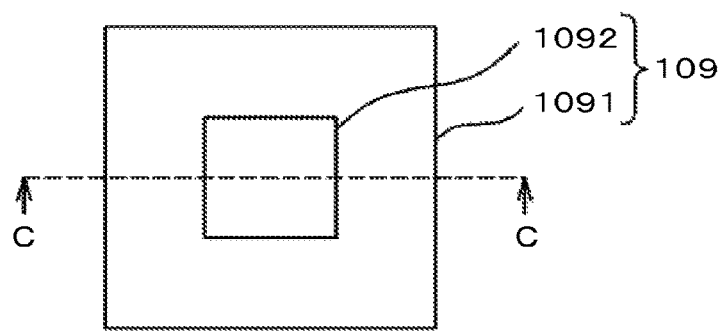
Figure 5:
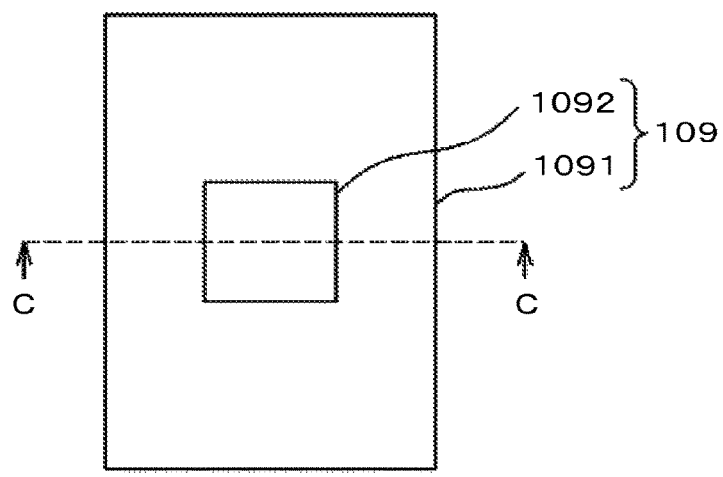

A cross-section of the through-hole 109 varies depending on a planar shape of the through-hole 109 or at what part of the through-hole 109 is cut to form the cross-section. FIGS. 5A to 5C illustrate definitions of a cross-section in various cases of the planar shape of the through-hole 109. FIG. 5A corresponds to a case where the planar shape of the through-hole 109 is a circle. In this case, a cross-section taken along line B-B passing through the center of the circle corresponds to FIG. 4. FIG. 5B corresponds to a case where the planar shape of the through-hole 109 is a square. In this case, a cross-section taken along line C-C on an axis of the square corresponds to FIG. 4. FIG. 5C corresponds to a case where the planar shape of the top face of the through-hole 109 is a rectangle. In this case, a cross-section taken along line D-D on a short axis of the through-hole 109 corresponds to FIG. 4. That is, in a case where a plan view of the top face of the through-hole 109 has a long axis and a short axis, the taper angle of the through-hole 109 is defined by the taper angle α on a short-axis cross-section, which is illustrated in FIG. 4.

In a conventional structure, if the angle α illustrated in FIG. 4 is about 50 degrees, at a certain frequency, the phenomenon occurs, in which the alignment film material 108 does not flow into the through-hole 109. If the angle α is equal to or larger than 60 degrees, the phenomenon occurs, in which the alignment film material 108 hardly flows into the through-hole 109. However, according to the present embodiment, even in a case where the angle α is equal to or larger than 50 degrees, the alignment film material 108 can flow into the through-holes 109 formed in all pixels. In addition, according to the present embodiment, even in a case where the angle α is equal to or larger than 60 degrees, the alignment film material 108 can flow into the through-holes 109 formed in all pixels. Accordingly, according to the present embodiment, display defects due to a thickness failure of the alignment film can be resolved.

Second Embodiment

Figure 6:
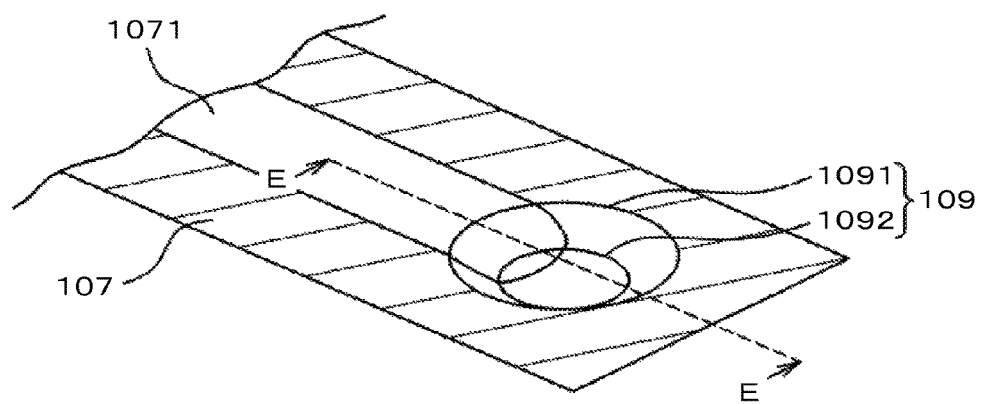
FIG. 6 is a perspective view illustrating a pixel electrode and a through-hole according to a second embodiment.

FIG. 6 is a perspective view illustrating a relationship between a pixel electrode 107 and a through-hole 109 according to a second embodiment of the present invention. In FIG. 6, a slit 1071 formed in a pixel electrode 10 extends in a through-hole 109. In the slit 1071, a surface thereof is formed of SiN configuring an interlayer insulating film 106, instead of ITO. Thus, an alignment film material 108 of a liquid form can flow into the through-hole 109, starting from a boundary portion of a step-like part of the ITO film. Further, because the surface is formed of the SiN film in the slit 1071, the alignment film material 108 is easier to wet and spread in this case than a case of using the ITO film. Thus, also from this aspect, the alignment film material 108 is easier to flow into the through-hole 109.

Figure 7:
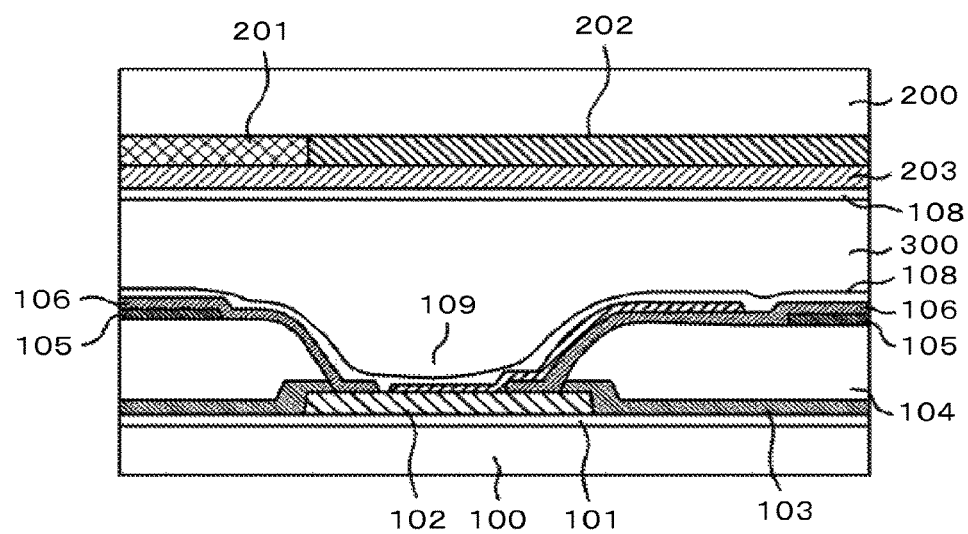
FIG. 7 is a cross-sectional view taken on line E-E shown in FIG. 6.

FIG. 7 is a cross-sectional view of a liquid crystal display device, which corresponds to a cross-section taken on line E-E shown in FIG. 6. FIG. 7 is similar to FIG. 3 illustrating the first embodiment, except for a configuration of the pixel electrode 107. In FIG. 7, the pixel electrode 107 extends in the through-hole 109 from the right side of the through-hole 109, and is connected to a source electrode 102. On the other hand, at the left side of the through-hole 107 shown in FIG. 7, the slit 1071 is formed, so that the pixel electrode 107 does not exist. Surfaces of an inner wall of the through-hole 109 and a periphery of a top face thereof are formed of SiN configuring the interlayer insulting film 106. Accordingly, the alignment film material 108 flows into the through-hole 109 from the left side of the through-hole 109, which corresponds to the slit 1071.

Figure 8:
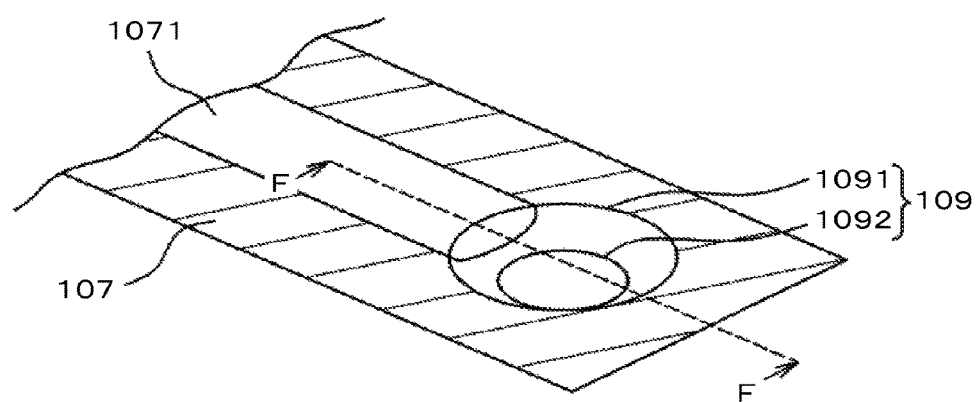
FIG. 8 is a perspective view illustrating a pixel electrode and a through-hole of another configuration of the second embodiment.
Figure 9:
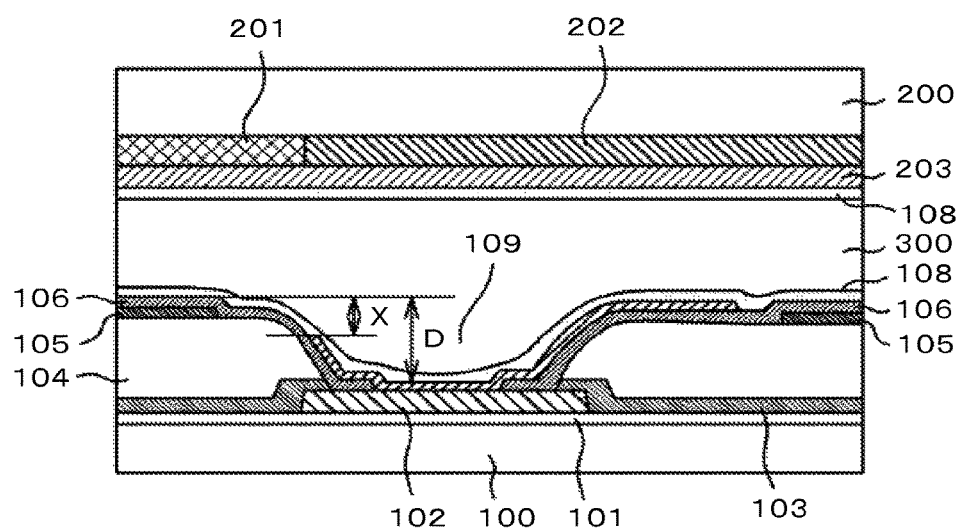
FIG. 9 is a cross-sectional view taken on line F-F shown in FIG. 8.

FIG. 8 illustrates another configuration of the present embodiment. In FIG. 8, the slit 1071 of the pixel electrode 107 is not formed to a bottom face of the through-hole 109. FIG. 9 is a cross-sectional view of the liquid crystal display device, which corresponds to a cross-section taken on line F-F shown in FIG. 8. FIG. 9 is similar to FIG. 7, except for a configuration of the pixel electrode 107.

In FIG. 8, in a left-side vicinity of a top face of the through-hole 109, and a portion extending from the top face to a position at a depth X thereof, the slit 1071 is formed, and no ITO film configuring the pixel electrode 107 exists. In FIG. 8, assuming that a depth of the through-hole 109 is D, part in which no ITO exists extends from the top face of the through-hole 109 to the position at the depth of X thereof. Under this part, an ITO film configuring the pixel electrode 107 exists.

Incidentally, a value of X is equal to or larger than a smaller one of D/4 and 1 μm. That is, if a portion where the SiN film configuring the interlayer insulating film 106 is exposed is smaller than X shown in FIG. 9, effects of causing the alignment film material 108 to flow into the through-hole 109 are small. Incidentally, the depth D of the through-hole 109 shown in FIG. 9 corresponds to a range from a top surface of the interlayer insulating film 106 to a top surface of the pixel electrode 107 provided in the through-hole 109. The depth X is determined with reference to a top surface of the interlayer insulating film 106. Since the thickness of the insulating film and the ITO film is small in comparison with the thickness of the organic passivation film, similar effects can be obtained even if the depth of D of the through-hole 109 shown in FIG. 9 is changed to the depth of D of the through-hole 109 formed in the organic passivation film 104 shown in FIG. 4, and if the value of X is changed to represent a value from the top surface of the organic passivation film 104.

Thus, even according to the present embodiment, the alignment film material 108 can preferably flow into the through-hole 109. According to the present embodiment, even in a case where the angle α is equal to or larger than 50 degrees, the alignment film material 108 can flow into the through-holes 109 respectively formed in all pixels. In addition, according to the present embodiment, even in a case where the angle α is equal to or larger than 60 degrees, the alignment film material 108 can flow into the through-holes 109 formed in all pixels. Accordingly, display defects due to a thickness failure of the alignment film 108 can be resolved by the present embodiment.

Third Embodiment

A third embodiment is an IPS liquid crystal display device configured so that a pixel electrode 107 formed in a planar and solid manner is arranged on a lower side, and that a common electrode 105 having a slit 1051 is provided on an upper side via an interlayer insulating film 106, contrary to the first embodiment.

Figure 10:
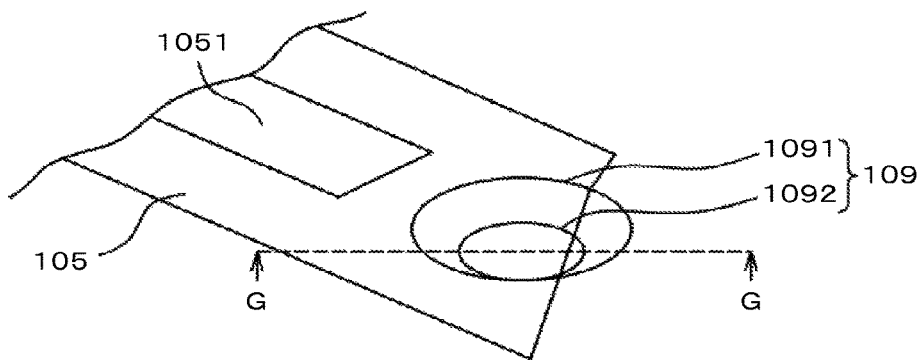
FIG. 10 is a perspective view illustrating a common electrode and a through-hole according to a third embodiment.

FIG. 10 is a perspective view illustrating a relationship between a common electrode 105 and a through-hole 109 according to the third embodiment. In FIG. 10, the common electrode 105 having the slit 1051 does not cover the entire inner wall of the through-hole 109. In an outside of the common electrode 105, the common electrode 105 does not cover the inner wall and the periphery of the top face of the through-hole 109.

Figure 11:
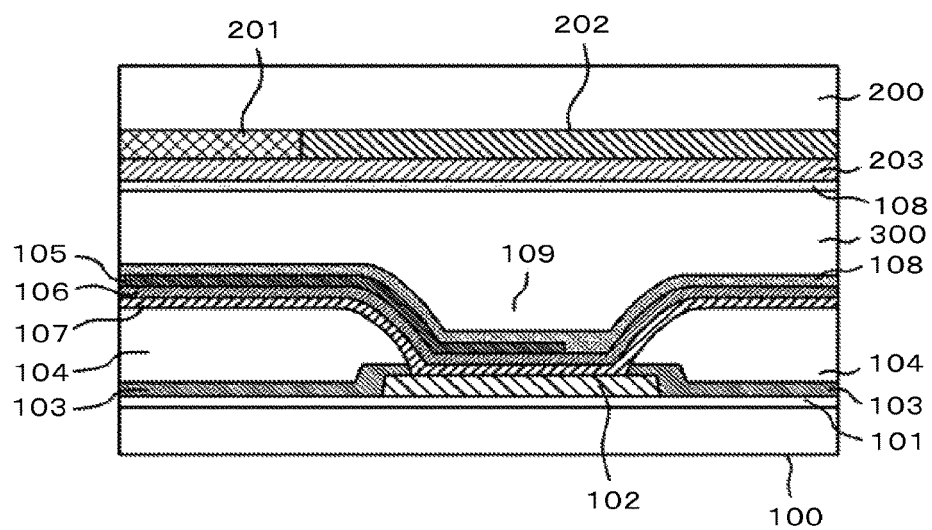
FIG. 11 is a cross-sectional view taken on line G-G shown in FIG. 10.

FIG. 11 is a cross-sectional view of the liquid crystal display device, which corresponds to the cross-section taken on line G-G shown in FIG. 10. The common electrode 105 is formed on a left-side periphery and a left-side inner wall of the through-hole 109, as viewed in FIG. 11. However, the common electrode 105 is not formed on a right-side periphery and a right-side inner wall of the through-hole 109.

When an alignment film material 108 of a liquid form is applied in such a configuration, the alignment film material 108 spreads over a SiN film configuring the interlayer insulating film 106 from an ITO film configuring the common electrode 105, similarly to the first embodiment in which surface condition is approximately same to that of the third embodiment. As illustrated in FIG. 11, the alignment film material 108 flows into the through-hole 109, so that the thickness of the alignment film 108 can be uniformized even in a periphery of the through-hole 109.

According to the present embodiment, even when the angle α is equal to or larger than 50 degrees, the alignment film material 108 can flow into the through-holes 109 formed in all pixels. In addition, according to the present embodiment, even when the angle α is equal to or larger than 60 degrees, the alignment film material 108 can stably flow into the through-holes 109 formed in all pixels. Accordingly, display defects due to a thickness failure of the alignment film can be resolved by the present embodiment.

Fourth Embodiment

A fourth embodiment is an IPS liquid crystal display device configured so that a pixel electrode 107 formed in a planar and solid manner is arranged on a lower side, and that a common electrode 105 having a slit 1051 is provided on an upper side via an interlayer insulating film 106, contrary to the second embodiment.

Figure 12:
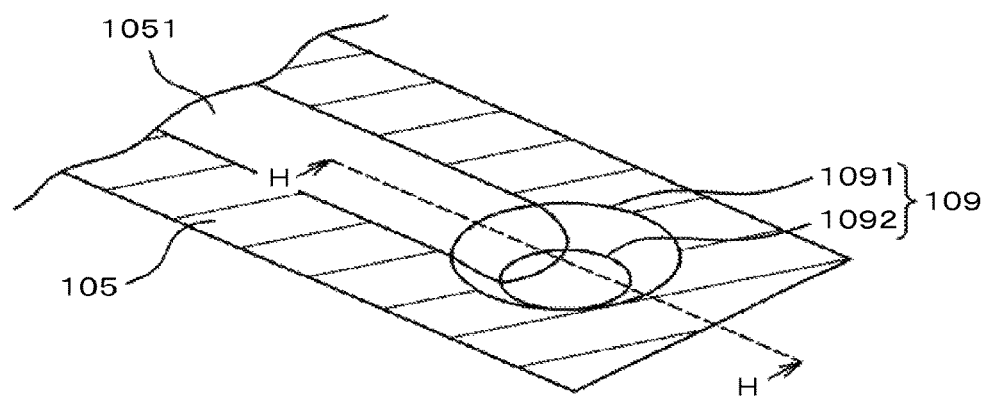
FIG. 12 is a perspective view illustrating a common electrode and a through-hole according to a fourth embodiment.

FIG. 12 is a perspective view illustrating a relationship between a common electrode 105 and a through-hole 109 according to the fourth embodiment. In FIG. 12, a slit 1051 formed in the common electrode 105 extends in the through-hole 109. In an inner wall part of the slit 1051, a surface thereof is formed of SiN configuring an interlayer insulating film 106, instead of ITO, similarly to the second embodiment. Accordingly, via the slit 1051 formed in the common electrode 105, the alignment film material 108 of a liquid form can flow into the through-hole 109, starting from a boundary portion of a step-like part of the ITO film.

Figure 13:
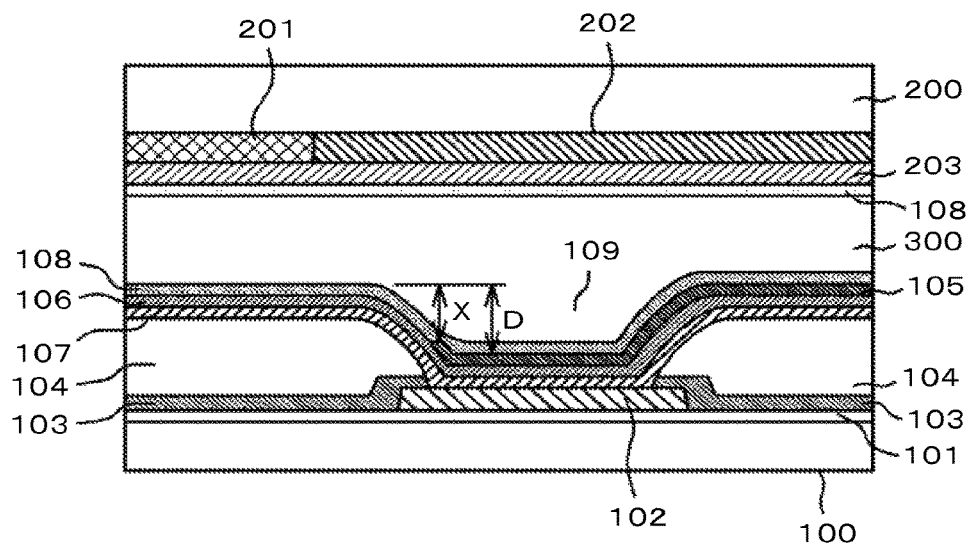
FIG. 13 is a cross-sectional view taken on line H-H shown in FIG. 12.
Figure 14:
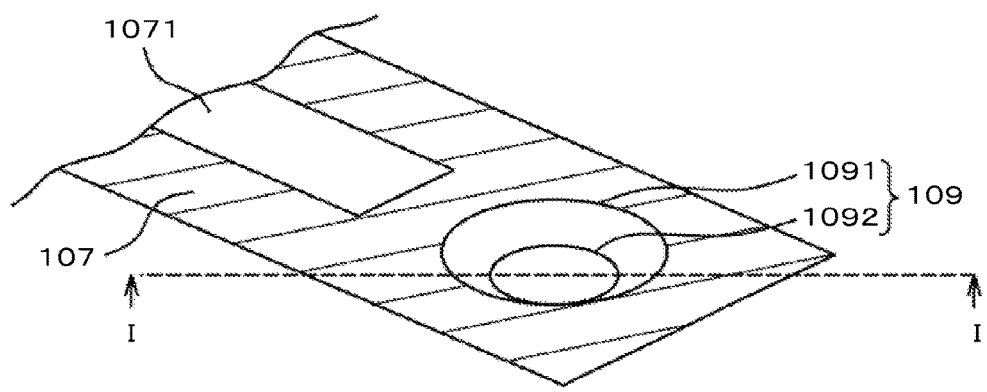
FIG. 14 is a perspective view illustrating a pixel electrode and a through-hole according to the related art.

FIG. 13 is a cross-sectional view of the liquid crystal display device, which corresponds to a cross-section taken on line H-H shown in FIG. 12. FIG. 13 is similar to FIG. 11 illustrating the third embodiment, except for a configuration of the common electrode 105. Since the slit 1051 is provided at the left side of the through-hole 109, as viewed in FIG. 13, the common electrode 105 does not exist there. Surfaces of an inner wall and a periphery of a top face of the through-hole 109 are formed of SiN configuring the interlayer insulating film 106. Thus, the alignment film material 108 easily flows into the through-hole 109 from the left side of the through-hole 109, which corresponds to the slit 1051.

In a case where the slit 1051 of an uppermost layer is not formed to a bottom face of the through-hole 109, as shown in FIG. 8 illustrating the second embodiment, similarly, assuming that the depth of the through-hole 109 is D, a slit is formed in a left-side vicinity of a top face of the through-hole 109, and a portion extending from the top face to a position at a depth X thereof. Under this slit, an ITO film configuring the pixel electrode 107 exists.

Incidentally, a value of X is equal to or larger than a smaller one of D/4 and 1 μm. For example, in a case where the slit 1051 reaches a bottom face of the through-hole 109, the value of X is equal to the value of D. According to the present embodiment, even in a case where the taper angle α is equal to or larger than 50 degrees, the alignment film material 108 can flow into the through-holes 109 formed in all pixels. Accordingly, according to the present embodiment, a display unevenness due to a thickness failure of the alignment film 108 can be resolved.

Incidentally, although it has been described that each of the pixel electrode and the common electrode is formed of an ITO film, the ITO film may be changed to a transparent electrically-conductive film, such as an IZO film. Further, in the second to fourth embodiments, the slit formed in the pixel electrode or in the common electrode extends in the through-hole. Thus, the liquid crystal can be driven in the through-hole. Therefore, the liquid crystal display device may have a structure in which the entire slit or part of the slit is exposed from the source electrode.

Incidentally, the present invention can be applied to an alignment film subjected to a photo-alignment treatment using polarized ultraviolet rays as well as the alignment film subjected to the alignment treatment using a rubbing method.

In the foregoing description, it has been described that the color filters are formed in the counter substrate. However, according to the present invention, the color filters may be formed in the TFT substrate. In this case, a color filter may be used instead of the organic passivation film. Alternatively, both of the organic passivation film and the color filter may be used.

In the foregoing description, a term "black matrix" is used. It is noted that "black matrix" includes the meaning of so called "black stripes" or its equivalent structures.

What is claimed is:

1. A liquid crystal display device comprising:
a transistor substrate having pixels each including,
a thin film transistor,
an organic insulating film formed on the thin film transistor,
a common electrode formed on the organic insulating film,
an interlayer insulating film formed so as to cover the common electrode,
a pixel electrode formed on the interlayer insulating film,
a source electrode of the thin film transistor
a counter substrate having a light shielding film, and
liquid crystal sandwiched between the transistor substrate and the counter substrate,
wherein the organic insulating film and the interlayer insulating film have a through-hole,
wherein the source electrode electrically connects to the pixel electrode via the through-hole, and
wherein the pixel electrode covers part of a side wall of the through-hole but does not cover the remaining part of the side wall of the through-hole.

2. The liquid crystal display device according to claim 1, wherein the common electrode has a slit.

3. The liquid crystal display device according to claim 2, wherein the slit overlaps with a part of the side wall.

4. The liquid crystal display device according to claim 1, where the through-hole formed in the organic insulating film assumes a cross-section in which a top face is defined on the side of the counter substrate and a bottom face is defined on the side of the source electrode, the top face having a diameter larger than that of the bottom face, the through-hole having a depth of D,
a taper angle at a depth of D/2 of the through-hole is equal to or more than 50 degrees.

5. The liquid crystal display device according to claim 4, where a taper angle at a depth of D/2 of the through-hole is equal to or more than 50 degrees, and
the slit of the pixel electrode extends to a depth of 1 μm or more from a top surface of the organic insulating film or to a depth of D/4 or more from the top surface of the organic insulating film.

6. The liquid crystal display device according to claim 1, wherein the taper angle of the through-hole is equal to or more than 60 degrees.

7. The liquid crystal display device according to claim 1, wherein an alignment film formed in the through-hole.

8. The liquid crystal display device according to claim 1, wherein the interlayer insulating film is formed of silicon nitride.

9. A liquid crystal display device comprising:
a transistor substrate having pixels each including,
a thin film transistor,
an organic insulating film formed on the thin film transistor,
a pixel electrode formed on the organic insulating film,
a source electrode of the thin film transistor,
an interlayer insulating film formed so as to cover the pixel electrode, and
a common electrode formed on the interlayer insulating film,
a counter substrate having a light shielding film, and
liquid crystal sandwiched between the transistor substrate and the counter substrate, wherein the organic insulating film has a through-hole,
wherein the source electrode electrically connects to the pixel electrode via the through-hole, and
wherein the common electrode overlaps with part of a side wall of the through-hole but does not overlap with the remaining part of the side wall of the through-hole.

10. The liquid crystal display device according to claim 9, wherein the common electrode has a slit.

11. The liquid crystal display device according to claim 10, wherein the slit overlaps with a part of the side wall.

12. The liquid crystal display device according to claim 9, where the through-hole formed in the organic insulating film assumes a cross-section in which a top face is defined on the side of the counter substrate and a bottom face is defined on the side of the source electrode, the top face having a diameter larger than that of the bottom face, the through-hole having a depth of D,
a taper angle at a depth of D/2 of the through-hole is equal to or more than 50 degrees.

13. The liquid crystal display device according to claim 12, where a taper angle at a depth of D/2 of the through-hole is equal to or more than 50 degrees, and the slit of the common electrode extends to a depth of 1 μm or more from a top surface of the organic insulating film or to a depth of D/4 or more from the top surface of the organic insulating film.

14. The liquid crystal display device according to claim 9, wherein the taper angle of the through-hole is equal to or more than 60 degrees.

15. The liquid crystal display device according to claim 9, wherein an alignment film formed in the through-hole.

16. The liquid crystal display device according to claim 9, wherein the interlayer insulating film is formed of silicon nitride.

* * * * *